United States Patent
Teng et al.

(10) Patent No.: US 11,641,350 B2
(45) Date of Patent: May 2, 2023

(54) INFORMATION PROCESSING METHOD AND INFORMATION PROCESSING SYSTEM FOR ENCRYPTION MACHINE

(71) Applicant: NETSUNION CLEARING CORPORATION, Beijing (CN)

(72) Inventors: Zhizhang Teng, Beijing (CN); Tong Zhao, Beijing (CN); Cunjing Shen, Beijing (CN); Chaoqun Li, Beijing (CN)

(73) Assignee: NETSUNION CLEARING CORPORATION, Beijing (CN)

( * ) Notice: Subject to any disclaimer, the term of this patent is extended or adjusted under 35 U.S.C. 154(b) by 265 days.

(21) Appl. No.: 17/052,043

(22) PCT Filed: May 13, 2019

(86) PCT No.: PCT/CN2019/086689
§ 371 (c)(1),
(2) Date: Oct. 30, 2020

(87) PCT Pub. No.: WO2019/218975
PCT Pub. Date: Nov. 21, 2019

(65) Prior Publication Data
US 2021/0194862 A1    Jun. 24, 2021

(30) Foreign Application Priority Data
May 14, 2018   (CN) .......................... 201810455257.4

(51) Int. Cl.
*H04L 29/06* (2006.01)
*H04L 9/40* (2022.01)
*H04L 47/762* (2022.01)

(52) U.S. Cl.
CPC ........ *H04L 63/0485* (2013.01); *H04L 47/762* (2013.01); *H04L 63/0236* (2013.01);
(Continued)

(58) Field of Classification Search
CPC ............... H04L 63/0485; H04L 47/762; H04L 63/0236; H04L 63/0471; H04L 63/104; H04L 63/12
See application file for complete search history.

(56) References Cited

U.S. PATENT DOCUMENTS 7,546,460 B2 * 6/2009 Maes .................. H04L 63/0428
   713/153
8,447,980 B2 * 5/2013 Godfrey ................ H04L 67/565
   713/170
(Continued)

FOREIGN PATENT DOCUMENTS

CN        1101195 A  *  4/1995  ......... H04N 1/32614
CN      103546427 A     1/2014
(Continued)

OTHER PUBLICATIONS

Padilla Serrano, M, "Search Report for EP Application No. 19802678.3", dated Feb. 4, 2022, EPO, Germany.
(Continued)

*Primary Examiner* — Shawnchoy Rahman
(74) *Attorney, Agent, or Firm* — Bridgeway IP Law Group, PLLC; Jihun Kim

(57) ABSTRACT

An information processing system includes: a service system, a plurality of agent machines, and a plurality of encryption machines. The plurality of agent machines and the plurality of encryption machines are divided into a plurality of groups, and each group includes at least two encryption machines and a plurality of agent machines communicatively connected to the at least two encryption machines. The encryption machine is configured to encrypt and decrypt data from the service system and to perform signature verification on the data when the service system performs a security call on the encryption machine via the agent machine in the group containing the encryption
(Continued)

machine. The service system is configured to perform service processing and to perform the security call on the encryption machine via the agent machine in the group containing the encryption machine.

11 Claims, 4 Drawing Sheets

(52) U.S. Cl.
CPC ........ *H04L 63/0471* (2013.01); *H04L 63/104* (2013.01); *H04L 63/12* (2013.01)

(56) References Cited

U.S. PATENT DOCUMENTS

| | | | |
|---|---|---|---|
| 2011/0268105 | A1 | 11/2011 | McGravie |
| 2015/0379281 | A1* | 12/2015 | Feroz ............... H04L 63/1441 713/189 |
| 2018/0063103 | A1 | 3/2018 | Jahid et al. |

FOREIGN PATENT DOCUMENTS

| | | |
|---|---|---|
| CN | 103634339 A | 3/2014 |
| CN | 103825698 A | 5/2014 |
| CN | 105933271 A | 9/2016 |
| CN | 106575338 A | 4/2017 |
| CN | 109726564 A | 5/2019 |

OTHER PUBLICATIONS

CNIPA Examiner, "Office Action for CN Application No. 201810455257.4" dated May 6, 2020, CNIPA, China.

* cited by examiner

INFORMATION PROCESSING METHOD AND INFORMATION PROCESSING SYSTEM FOR ENCRYPTION MACHINE

CROSS-REFERENCE TO RELATED APPLICATION(S)

The present disclosure is a US national phase application of International Application No. PCT/CN2019/086689, filed on May 13, 2019, which claims priority to Chinese Patent Application No. 201810455257.4, entitled "information processing method and information processing system for encryption machine" filed by NETSUNION CLEARING CORPORATION with the China National Intellectual Property Administration on May 14, 2018.

FIELD

The present disclosure relates to a field of information encryption and decryption technologies, and more particularly to an information processing method for an encryption machine and an information processing system.

BACKGROUND

An encryption machine is an electronic device with an encryption function, which is widely used in financial institutions such as banks, clearing institutions, and third-party payment institutions. The encryption machine is mainly used to encrypt and decrypt a bank card password, to calculate a transaction MAC, and to ensure a security of sensitive data in a transaction. Since there are a plurality of manufacturers of encryption machines, and instruction interfaces of the encryption machines produced by respective manufacturers are different. Presently, by adding an agent layer between the encryption machine and a service system, when the service system needs to call the encryption machine, a communication between the service system and the encryption machine may be implemented by the agent machine.

SUMMARY

The present disclosure aims to solve at least one of the technical problems in the related art to some extents.

Embodiments of the present disclosure provides an information processing system for an encryption machine. The information processing system includes: a service system, a plurality of agent machines, and a plurality of encryption machines. The plurality of agent machines and the plurality of encryption machines are divided into a plurality of groups, and each group includes at least two encryption machines and a plurality of agent machines communicatively connected to the at least two encryption machines. The encryption machine is configured to encrypt and decrypt data from the service system and to perform signature verification on the data when the service system performs a security call on the encryption machine via the agent machine in the group containing the encryption machine. The service system is configured to perform service processing and to perform the security call on the encryption machine via the agent machine in the group containing the encryption machine. The agent machine is communicatively connected to the service system and to the encryption machine in the group containing the agent machine, and configured to perform protocol conversion between the service system and the encryption machine in the group.

Embodiments of the present disclosure provides an information processing method for an encryption machine. The method includes: sending, by a service system, a security call request for performing security call on an encryption machine to an agent machine via a special interface protocol; obtaining, by the agent machine, an idle connection from a resource pool and occupying said connection to communicate with the encryption machine; convert, by the agent machine, the special interface protocol employed by the service system for sending the security call request to a private protocol employed by the encryption machine, and sending, by the agent machine, the security call request to the encryption machine via said connection under the private protocol; and performing, by the encryption machine, encryption and decryption processing, or signature verification on data from the service system based on the security call request under the private protocol.

Embodiments of the present disclosure provides a non-transitory computer-readable storage medium having stored therein instructions that, when executed by a processor of a device, cause the processor to perform an information processing method for an encryption machine. The method includes: sending, by a service system, a security call request for performing security call on an encryption machine to an agent machine via a special interface protocol; obtaining, by the agent machine, an idle connection from a resource pool and occupying said connection to communicate with the encryption machine; convert, by the agent machine, the special interface protocol employed by the service system for sending the security call request to a private protocol employed by the encryption machine, and sending, by the agent machine, the security call request to the encryption machine via said connection under the private protocol; and performing, by the encryption machine, encryption and decryption processing, or signature verification on data from the service system based on the security call request under the private protocol.

Additional aspects and advantages of the present disclosure will be set forth in part in the following descriptions, and will become apparent in part from the following descriptions, or be learned from the practice of the present disclosure.

BRIEF DESCRIPTION OF THE DRAWINGS

The above and/or additional aspects and advantages of the present disclosure will become apparent and easily understood from the following descriptions of embodiments in combination with the accompanying drawings, in which.

DETAILED DESCRIPTION

Figure 1:
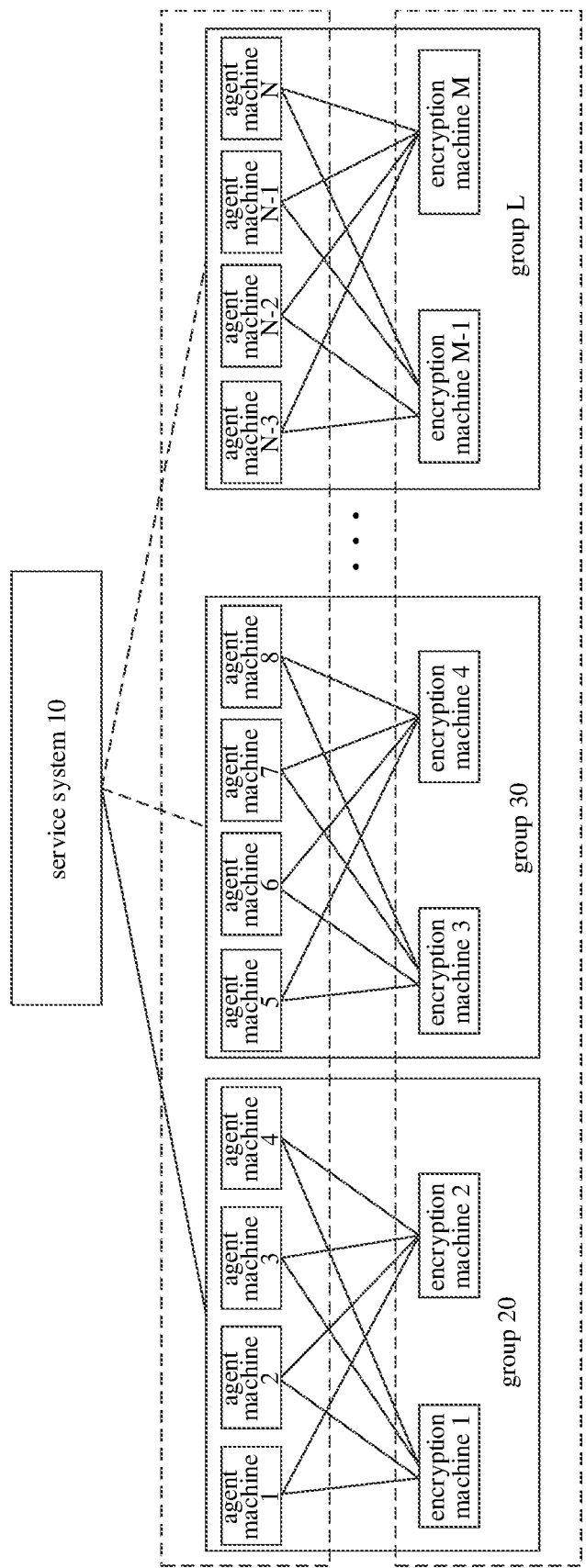
FIG. 1 is a block diagram illustrating an information processing system for an encryption machine according to an embodiment of the present disclosure.

Description will be made in detail below to embodiments of the present disclosure. Examples of those embodiments are illustrated in accompanying drawings. Same or similar reference numerals refer to same or similar elements or elements having same or similar functions throughout. The embodiments described below with reference to the accompanying drawings are exemplary and are intended to explain the present disclosure, but should not be construed as a limitation of the present disclosure.

In the related art, one-to-more connection way is adopted between the encryption machines and the agent machines. Each encryption machine is connected to a plurality of agent machines, one agent machine is connected to only one encryption machine, and a barrel structure is formed between the encryption machine and the plurality of agent machines. In this way, when a certain encryption machine fails, it is impossible to retry connecting the encryption machine by the agent machine to implement that the service system successfully calls the encryption machine, and a successful rate of calling the encryption machine by the service system is reduced.

Description will be made below to an information processing method for an encryption machine and an information processing system according to embodiments of the present disclosure with reference to accompanying drawings.

An agent machine is communicatively connected to a service system and to an encryption machine, to implement protocol conversion between the service system and the encryption machine. Presently, a connection between the agent machine and the encryption machine mostly employs following two ways.

In the first way, agent machines and encryption machines are connected in a more-to-more way. Each agent machine may be connected to all the encryption machines, and each encryption machine is also connected to all the agent machines. However, there are following disadvantages in the way.

1) For the sake of security, each encryption machine may be configured with a white list composed of IP (Internet protocol) addresses. When an agent machine is added in a horizontal direction, original encryption machines need to modify the white lists composed of IP addresses. When an encryption machine needs to be added, an original running agent machine also needs to be restarted when accessing the added encryption machine. Therefore, for adding the agent machine or the encryption machine, the change procedure has certain influence on a stability of a production system.

2) The white list supports limited addresses. In this way, a large-scale expansion of agent machines does not be supported.

3) When an encryption machine fails, it is difficult to isolate the failed encryption machine because all the agent machines are connected to the failed encryption machine.

In the second way, the encryption machines and the agent machines are connected in a one-to-more way, each encryption machine is connected to a plurality of agent machines, and one agent machine is connected with only one encryption machine. A barrel structure between the plurality of agent machines and the encryption machine is formed with the encryption machine as a group. In this way, the disadvantages existing in the first way are solved. However, following disadvantages still exist.

1) When a certain encryption machine fails, it is impossible to retry to connect to the failed encryption machine at the agent layer to implement a successful call.

To solve the above technical problems, embodiments of the present disclosure provide an information processing system for an encryption machine. FIG. 1 is a block diagram illustrating an information processing system for an encryption machine according to an embodiment of the present disclosure.

As illustrated in FIG. 1, the system includes: a service system 10, agent machines 1, 2, . . . , N, and encryption machines 1, 2, . . . , M. The agent machines 1, 2, . . . , N, and the encryption machines 1, 2, . . . , M are divided into a plurality of groups. The number of groups is greater than 2. Each group includes at least two encryption machines and a plurality of agent machines communicatively connected to the at least two encryption machines. For convenience of distinguishing, one of the plurality of groups is called a group 20, and the other groups are called group 30, . . . , L. The at least two encryption machines included in each group have a same encryption and decryption procedure, and the plurality of agent machines have same configuration. By grouping the plurality of agent machines and the plurality of encryption machines, each encryption machine in each group is connected to each agent machine in the group. When an encryption machine in the group fails, since the other encryption machine in the group has the same function, the other encryption machine may be called again by the agent machine, such that the service system may call the encryption machine successfully, and a successful rate of the call is improved In the system provided by this embodiment, different encryption machines and agent machines included in the plurality of groups perform the same method and are connected in the same way. Therefore, for convenience of explanation, a group such as the group 20 is taken as an example to explain the system, and other groups will not be described in detail.

In detail, the group 20 includes at least two encryption machines, such as an encryption machine 1 and an encryption machine 2, and a plurality of agent machines communicatively connected to the at least two encryption machines, such as an agent machine 1, an agent machine 2, an agent machine 3 and an agent machine 4.

The encryption machine 1 and the encryption machine 2 are configured to encrypt and decrypt data of the service system 10, and to perform signature verification on the data when service system 10 performs a security call by the agent machine 1, the agent machine 2, the agent machine 3, or the agent machine 4 in the group 20.

The service system 10 is configured to perform service processing and to perform the security call on the encryption machine via the agent machine in the group containing the encryption machine. For example, the agent machine 1, the agent machine 2, the agent machine 3, or the agent machine 4 in the group 20 performs the security call on the encryption machine 1 or the encryption machine 2 in the group.

The agent machine 1, the agent machine 2, the agent machine 3, and the agent machine 4 are communicatively connected to the service system 10, and also communicatively connected to the encryption machine 1 and the encryption machine 2 in the group, which are configured to perform protocol conversion between the service system 10 and the encryption machine 1 in the group 20, and between the service system 10 and the encryption machine 2 in the group 20.

As a possible implementation, the agent machines and the encryption machines in different groups are isolated from each other, such that when an encryption machine in a certain group fails, the failed encryption machine may be isolated in the group, thus other groups work normally and the stability of the whole system is implemented.

The information processing system for the encryption machine in this embodiment of the present disclosure includes the service system, the plurality of agent machines, and the plurality of encryption machines. The encryption machine is configured to encrypt and decrypt the data from the service system and to perform signature verification on the data when the service system performs the security call on the encryption machine via the agent machine. The service system is configured to perform the security call on the encryption machine via the agent machine in the group containing the encryption machine. The agent machine is communicatively connected to the service system and to the encryption machine in the group containing the agent machine, and configured to perform the protocol conversion. The plurality of agent machines and the plurality of encryption machines are divided into the plurality of groups, each group includes the at least two encryption machines, and each encryption machine is connected to the plurality of agent machines, thereby solving the problems in the related art that when the encryption machine fails, the failed encryption machine may not be isolated by employing the connection between the agent machine and the encryption machine, and the agent machine may not retry the connection with the encryption machine to implement the successful call of the service system on the encryption machine.

Figure 2:
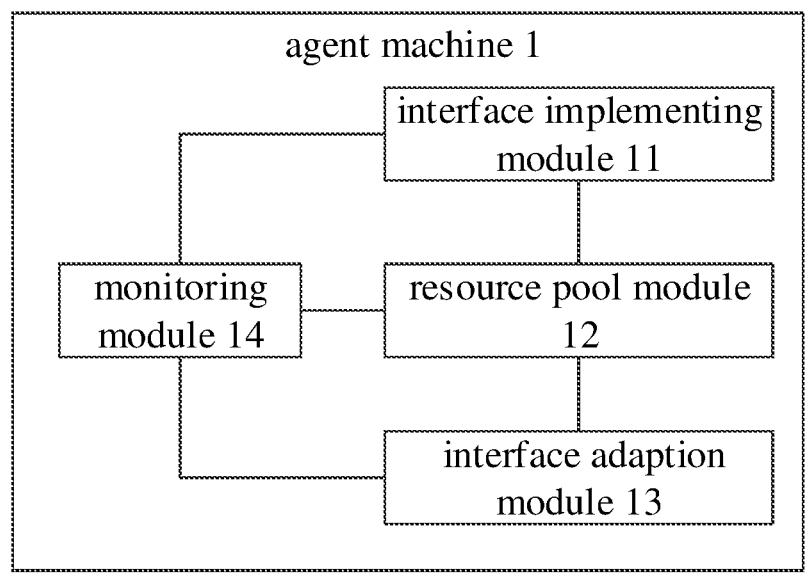
FIG. 2 is a block diagram illustrating an information processing system for an encryption machine according to another embodiment of the present disclosure.

On the basis of the above embodiment, embodiments of the present disclosure also provide an information processing system for an encryption machine, which explains more clearly how to implement the protocol conversion between the service system and the encryption machine in the group via the agent machine. FIG. 2 is a block diagram illustrating an information processing system for an encryption machine according to another embodiment of the present disclosure. Since respective agent machines included in each group have same components and functions, the agent machine 1 is taken as an example for explanation. As illustrated in FIG. 2, the agent machine 1 includes: an interface implementing module 11, a resource pool module 12, an interface adaption module 13, and a monitoring module 14.

The interface implementing module 11 is configured to communicate with the service system 10 via a special interface protocol, such that the agent machine 1 is accessed via the special interface protocol when the service system 10 needs to access the encryption machine 1 or the encryption machine 2, and then the security call on the encryption machine 1 or encryption machine 2 is implemented. The special interface protocol includes a plurality of possible implementations. As a possible implementation, the special interface protocol includes a RPC (remote procedure call protocol).

The resource pool module 12 is configured to obtain an idle connection from a resource pool and to occupy said connection to establish a connection between the agent machine 1 and the encryption machine 1 or between the agent machine 1 and the encryption machine 2 when the service system 10 performs the security call on the encryption machine 1 or the encryption machine 2, thereby implementing the communication between the service system and the encryption machine 1 or between the service system and the encryption machine 2. The resource pool module 12 is configured to release the connection when the service system 10 terminates the security call on the encryption machine 1 or the encryption machine 2. The resource pool is located between the agent machine 1 and the encryption machine 1, and between the agent machine 1 and the encryption machine 2. The resource pool includes a plurality of connections. A network address adopted by each connection in the resource pool is in a white list of the group containing the agent machine, and the white list is stored in each encryption machine in the group. The encryption machines in the same group have the same white lists stored thereon. By configuring the white list of IP addresses for each encryption machine, an accessing rights is set, and the security of each encryption machine is improved.

As a possible implementation, each connection may be a TCP (transmission control protocol) persistent connection, such that each connection maintains a connection state with the encryption machine 1 and the encryption machine 2. When the service system 10 needs to call the encryption machine 1 or the encryption machine 2, the communication of the service system 10 with the encryption machine 1 or the encryption machine 2 may be implemented after obtaining the corresponding connection from the resource pool, and the efficiency is high.

It should be noted that, the service system 10 releases the connection and returns the connection to the resource pool after performing the security call on the encryption machine 1 or the encryption machine 2 via the agent machine 1. The release here is not to disconnect the connection, but to make it in an idle state, such that the connection may be obtained from the resource pool in a next call, thereby omitting a repeated creating procedure of the connection of the agent machine 1 to the encryption machine 1 or the encryption machine 2, and improving the efficiency by multiplexing.

The interface adaption module 13 is configured to maintain a private protocol of the encryption machine 1 or the encryption machine 2, and to perform protocol conversion between the private protocol and the special interface protocol on data transmitted via the connection. The monitoring module 14 is respectively connected to the interface adaption module 11, the resource pool module 12 and the interface implementing module 13, and configured to monitor operations of the interface adaption module 11, the resource pool module 12 and the interface implementing module 13, to perform statistics on the security call to obtain one or more combinations of time consumption, the number of calls and a failure rate of the security call. By monitoring the operation of each module in the agent machine 1 and obtaining relevant data, unified management and deployment for the security call of the service system 10 on the encryption machine 1 or the encryption machine 2 may be implemented.

The information processing system for the encryption machine according to this embodiment of the present disclosure includes the service system, and the agent machines and the encryption machines in the plurality of groups.

The encryption machine is configured to encrypt and decrypt the data from the service system and to perform signature verification on the data when the service system performs the security call on the encryption machine via the agent machine. The service system is configured to perform the security call on the encryption machine via the agent machine in the group containing the encryption machine. The agent machine is communicatively connected to the service system and to the encryption machine in the group containing the agent machine, and configured to perform the protocol conversion. The plurality of agent machines and the plurality of encryption machines are divided into the plurality of groups, each group includes the at least two encryption machines, and each encryption machine is connected to the plurality of agent machines, thereby solving the problems in the related art that when the encryption machine fails, the failed encryption machine may not be isolated by employing the connection between the agent machine and the encryption machine, and the agent machine may not retry the connection with the encryption machine to implement the successful call of the service system on the encryption machine. Moreover, by reusing the connection in the resource pool, the efficiency of calling the encryption machine by the service system is improved.

Figure 3:
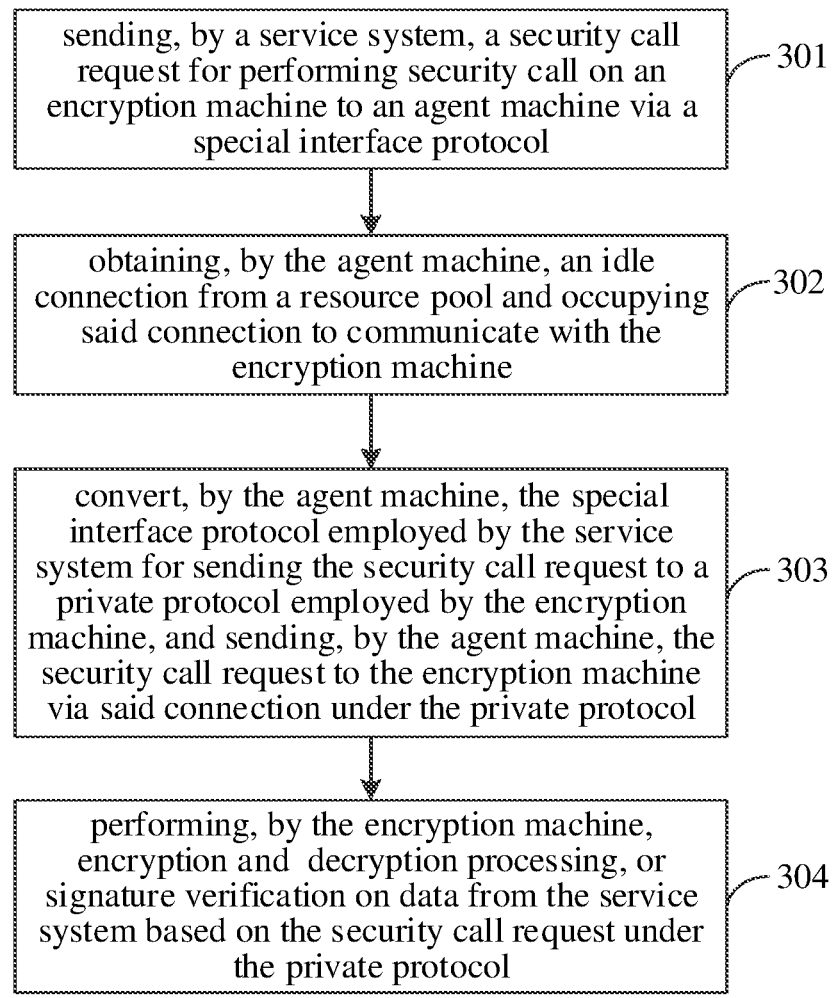
FIG. 3 is a flow chart illustrating an information processing method for an encryption machine according to an embodiment of the present disclosure.

Based on the above embodiment, the present disclosure provides an information processing method for an encryption machine. The method is applied to the above system. FIG. 3 is a flow chart illustrating an information processing method for an encryption machine according to an embodiment of the present disclosure. As illustrated in FIG. 3, the method includes the following.

At block 301, a service system sends a security call request for performing security call on an encryption machine to an agent machine via a special interface protocol.

In detail, the service system selects a group containing the encryption machine and the agent machine based on the security call request when needing to perform the security call on the encryption machine. Since at least two agent machines with same configurations are contained in the group, the service system may randomly select one agent machine to send the security call request for performing the security call on the encryption machine, thus an interface implementing module in the agent machine may obtain the security call request via the special interface protocol. As a possible implementation, the special interface protocol includes a RPC protocol, through which the interface implementing module in the agent machine receives the security call request from the security system.

At block 302, the agent machine obtains an idle connection from a resource pool and occupies said connection to communicate with the encryption machine.

In detail, the group also includes a plurality of encryption machines connected to the at least two agent machines, and the plurality of encryption machines perform the same encryption and decryption procedures. A resource pool module in the agent machine is configured to summarize the connections connected with the plurality of encryption machines into the resource pool. As a possible implementation, the connections in the resource pool may be TCP persistent connections. When the service system needs to perform the security call on the encryption machine, the resource pool module in the agent machine determines whether the idle connection exists in the resource pool. The resource pool module in the agent machine is configured to directly obtain the idle connection in a case that the idle connection exists in the resource pool. The resource pool module in the agent machine is configured to establish a new connection with the encryption machine based on a network address in a white list of the group containing the agent machine in a case that the idle connection does not exist in the resource pool. Then, an encryption machine is randomly selected from the plurality of encryption machines, and the agent machine and the encryption machine are connected via a determined connection, such that the service system may securely call the encryption machine.

Alternatively, the resource pool module in the agent machine releases the connection when the service system terminates the security call on the encryption machine. When other service system needs to securely call the encryption machine, the connection may also be used, thereby implementing multiplexing of the connection.

There are a plurality of possible implementations for the resource pool. As a possible implementation, in this embodiment, the resource pool may be achieved by a connection pool technology apache pool2, but the implementation is not limited in this embodiment.

At block 303, the agent machine converts the special interface protocol employed by the service system for sending the security call request to a private protocol employed by the encryption machine, and sends the security call request to the encryption machine via the connection under the private protocol.

In detail, the interface implementing module in the agent machine receives the security call request from the service system using the special interface protocol, converts the special interface protocol employed by the service system to the private protocol employed by the encryption machine by the interface adaption module in the agent machine, and sends the security call request to the encryption machine via the idle connection in the resource pool under the private protocol.

As a possible implementation, when the agent machine sends the security call request to the encryption machine, the agent machine resends the security call request for threshold times when the security call request fails to be sent. By increasing the number of resending the security call request by the agent machine, a successful probability of calling the encryption machine via the agent machine may be improved, that is, the successful rate of calling the encryption machine by the service system may be improved. As another possible implementation, in the case that the security call request fails to be sent, the agent machine may re-select an encryption machine in the group for communicatively connection and resend the security call request, which also improves the successful rate of the service system calling the encryption machine.

At block 304, the encryption machine performs encryption and decryption processing or signature verification on data from the service system based on the security call request under the private protocol.

In detail, the encryption machine performs the encryption and decryption processing or the signature verification on the data from the service system based on the received security call request sent by the agent machine.

Alternatively, the encryption machine generates a security call response based on the security call request after performing the encryption and decryption processing or the signature verification on the data sent by the service system. The security call response carries a result obtained by the encryption machine performing the encryption and decryption processing on the data from the service system based on the security call request. The agent machine receives the security call response via the connection in the resource pool, and converts the security call response from the private protocol to the special interface protocol by an interface adaption module in the agent machine. The agent machine sends the security call response to the service system under the special interface protocol.

With the information processing method for the encryption machine according to embodiments of the present disclosure, the service system sends the security call request for performing the security call on the encryption machine to the agent machine via the special interface protocol, the agent machine obtains the idle connection from the resource pool and occupies said connection to communicate with the encryption machine, the agent machine converts the special interface protocol employed by the service system for sending the security call request to the private protocol employed by the encryption machine, and sends the security call request to the encryption machine via said connection under the private protocol, and the encryption machine performs the encryption and decryption processing or the signature verification on the data from the service system based on the security call request under the private protocol. The plurality of agent machines and the plurality of encryption machines are divided into the plurality of groups, each group includes the at least two encryption machines, and each encryption machine is connected to the plurality of agent machines, thereby solving the problems in the related art that when the encryption machine fails, the failed encryption machine may not be isolated by employing the connection between the agent machine and the encryption machine, and the agent machine may not retry the connection with the encryption machine to implement the successful call of the service system on the encryption machine.

Figure 4:
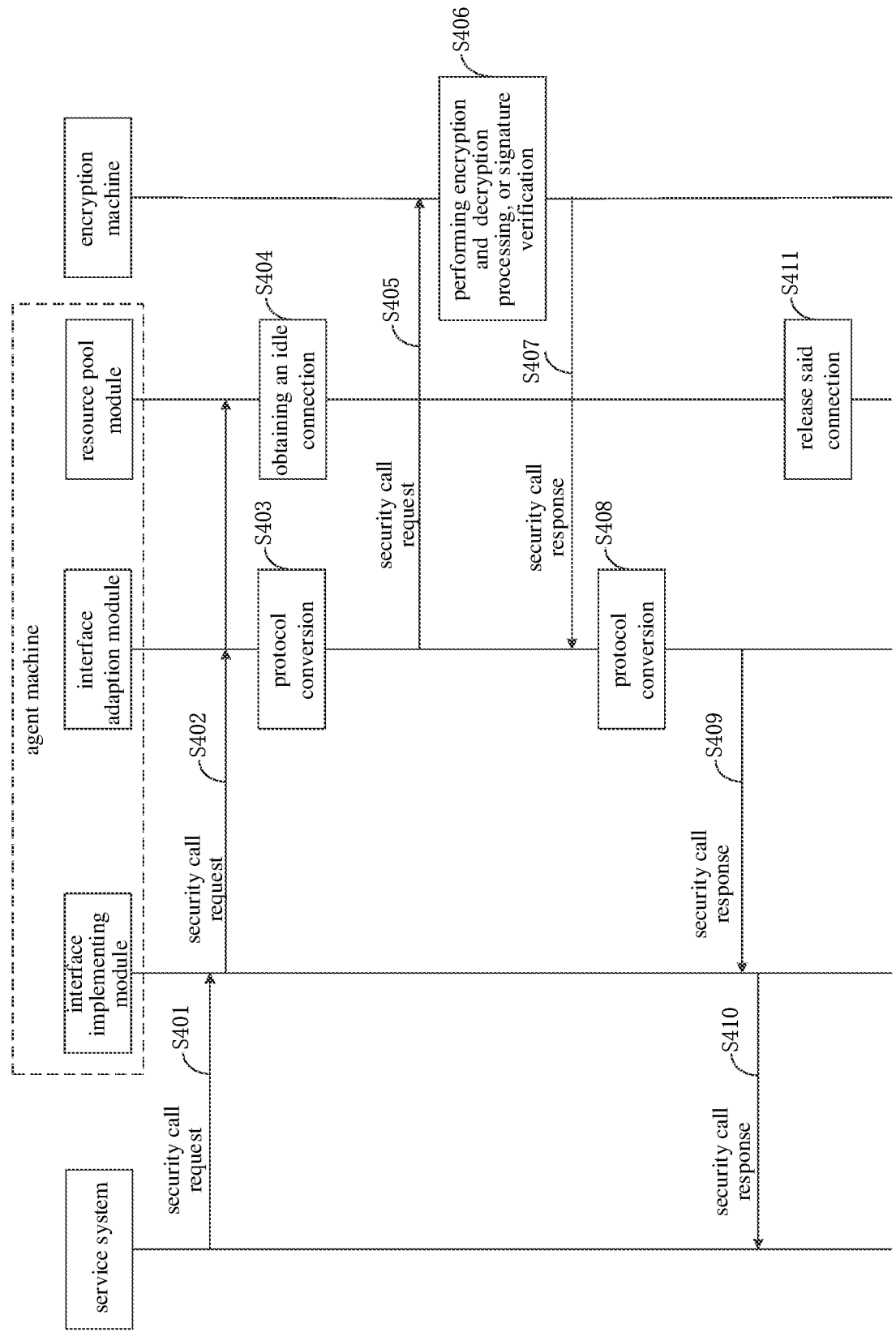
FIG. 4 is a flow chart illustrating an interaction method for information processing of an encryption machine according to an embodiment of the present disclosure.

Based on the above embodiments, the present disclosure also provides an interaction method for information processing of an encryption machine, which further clearly explains the procedure of information processing between the service system and the encryption machine via the agent machine to implement the security call. FIG. 4 is a flow chart illustrating an interaction method for information processing of an encryption machine according to an embodiment of the present disclosure. As illustrated in FIG. 4, the agent machine includes an interface implementing module, an interface adaption module, and a resource pool module. The method includes the following.

At block S401, the service system sends the security call request to the interface implementing module in the agent machine via a special interface protocol.

In detail, when the service system needs to securely call the encryption machine, the service system selects a group containing the encryption machine and the agent machine based on a call requirement. Since a plurality of agent machines included in the group have same configurations, one agent machine may be randomly selected, and the security call request may be sent to the interface implementing module via the special interface protocol of the agent machine.

At block S402, the interface implementing module in the agent machine sends the security call request to the interface adaption module and the resource pool module in the agent machine.

In detail, the interface implementing module in the agent machine sends the security call request obtained by the service system to the interface adaption module and the resource pool module in the agent machine. All the interface implementing module, the interface adaption module and the resource pool module belong to an agent layer. As a possible implementation, data transmission between these modules may be implemented by calling an internal interface.

At block S403, the interface adaption module in the agent machine performs protocol conversion on the security call request.

In detail, the interface adaption module in the agent machine performs the protocol conversion on a received security call request, and converts data corresponding to the security call request from the special interface protocol of the service system to the private protocol of the corresponding encryption machine.

At block S404, the resource pool module in the agent machine obtains an idle connection.

In detail, the resource pool module in the agent machine queries the idle connection from the resource pool. The connection is used for data transmission between the service system and the encryption machine.

Alternatively, when the agent machine does not query the idle connection from the resource pool, the resource pool module in the agent machine establishes a new connection with the encryption machine based on a network address in the white list of the group containing the agent machine, and implements the connection between the agent machine and the encryption machine via the newly established connection, thereby implementing the data transmission between the service system and the encryption machine.

At block S405, the interface adaption module in the agent machine sends the security call request after the protocol conversion to the encryption machine via the private protocol.

Alternatively, the agent machine resends the security call request for threshold times when the agent machine fails to send the security call request to the encryption machine via the private protocol. By increasing the number of resending the security call request via the agent machine, the successful probability of calling the agent machine to the encryption machine may be improved.

At block S406, the encryption machine performs encryption and decryption processing or signature verification on data from the service system.

In detail, after receiving the security call request of the service system, the encryption machine encrypts and decrypts the data carried by the security call request from the service system, and performs the signature verification on data from the service system, to obtain a corresponding result, which is a security call response.

At block S407, the encryption machine sends the obtained security call response to the interface adaption module in the agent machine via the private protocol.

In detail, the encryption machine sends the obtained security call response to the interface adaption module in the agent machine via the connection of the resource pool module.

At block S408, the interface adaption module in the agent machine perform the protocol conversion on the security call response.

In detail, the interface adaption module in the agent machine converts the received security call response under the private protocol to a security call response under the special interface protocol.

At block S409, the interface adaption module in the agent machine sends the security call response after the protocol conversion to the interface implementing module in the agent machine via the special interface protocol.

At block S410, the interface implementing module in the agent machine sends the security call response to the service system.

In detail, the interface implementing module sends the security call response to the service system via the special interface protocol to complete the security call of the service system on the encryption machine.

At block S411, the resource pool module in the agent machine releases the connection when the service system terminates the security call on the encryption machine.

In detail, the resource pool module in the agent machine releases the occupied connection. When the service system performs the security call on the encryption machine again, the connection may be reused, thereby improving the efficiency of the security call of the service system on the encryption machine.

With the information processing method for the encryption machine according to embodiments of the present disclosure, the service system sends the security call request for performing the security call on the encryption machine to the agent machine via the special interface protocol, the agent machine obtains the idle connection from the resource pool and occupies said connection to communicate with the encryption machine, the agent machine converts the special interface protocol employed by the service system for sending the security call request to the private protocol employed by the encryption machine, and sends the security call request to the encryption machine via said connection under the private protocol, and the encryption machine performs the encryption and decryption processing or the signature verification on the data from the service system based on the security call request under the private protocol. The plurality of agent machines and the plurality of encryption machines are divided into the plurality of groups, each group includes the at least two encryption machines, and each encryption machine is connected to the plurality of agent machines, thereby solving the problems in the related art that when the encryption machine fails, the failed encryption machine may not be isolated by employing the connection between the agent machine and the encryption machine, and the agent machine may not retry the connection with the encryption machine to implement the successful call of the service system on the encryption machine.

In the description of the present disclosure, reference throughout this specification to "an embodiment", "some embodiments", "an example", "a specific example", or "some examples" means that a particular feature, structure, material or feature described in connection with the embodiment or example is included in at least one embodiment or example of the present disclosure. The appearances of the above phrases throughout this specification are not necessarily referring to the same embodiment or example. Furthermore, particular feature, structure, material or feature described may be combined in any one or more embodiments or examples in a suitable manner. Furthermore, without contradicting each other, the skilled in the art may combine different embodiments or examples described in this specification and features of different embodiments or examples.

In addition, the terms "first" and "second" are only for description purpose, and cannot be understood as indicating or implying relative importance or implicitly indicating the number of indicated technical features. Therefore, the features defined with "first" and "second" can include at least one of the features explicitly or implicitly. In the description of the present disclosure, the term "a plurality of" means two or more, such as two and three, unless specified otherwise.

Any procedure or method described in a flow chart or described herein in other ways may be understood to include one or more modules, segments or portions of codes of executable instructions for achieving specific logical functions or steps in the procedure, and the scope of a preferred embodiment of the present disclosure includes other implementations. The order of execution is different from that which is depicted or discussed, including executing functions in a substantially simultaneous manner or in an opposite order according to the related functions, which should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More detailed examples of the computer readable medium include, but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be implemented by the hardware, software, firmware or a combination thereof. In the above embodiments, a plurality of steps or methods may be implemented by the software or firmware stored in the memory and executed by the appropriate instruction execution system. For example, if it is implemented by the hardware, likewise in another embodiment, the steps or methods may be implemented by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above embodiment method may be achieved by commanding the related hardware with a program. The program may be stored in a computer readable storage medium, and the program includes one or a combination of the steps in the method embodiments when operated on a computer.

In addition, each function unit of each embodiment of the present disclosure may be integrated in a processing module, or these units may be separate physical existence, or two or more units are integrated in a processing module. The integrated module may be implemented in a form of hardware or in a form of software function modules. When the integrated module is implemented in the form of software function module and is sold or used as a standalone product, the integrated module may be stored in a computer readable storage medium.

The storage medium mentioned above may be a read-only memory, a magnetic disk or CD, etc. Although embodiments of the present disclosure have been shown and described above, it should be understood that the above embodiments are exemplary and should not be construed as limiting the present disclosure. The skilled in the art can make changes, modifications, substitutions and variations to the above embodiments within the scope of the present disclosure.

What is claimed is:

1. An information processing system, comprising:
a server;
a plurality of agents; and
a plurality of encryptors, wherein the plurality of agents and the plurality of encryptors are divided into a plurality of groups, and each group comprises at least two encryptors and a plurality of agents communicatively connected to the at least two encryptors in a more-to-more way, where each encryptor is connected to the plurality of agents and each agent is connected to the at least two encryptors, wherein each encryptor is configured to encrypt and decrypt data from the server and to perform signature verification on the data when the server performs a security call on the encryptor via an agent in the group containing the encryptor, wherein the server is configured to perform service processing and to perform the security call on the encryptor via the agent in the group containing the encryptor, wherein the server is not arranged in each group, and wherein the agent is communicatively connected to the server and to the encryptor in the group containing the agent, and configured to perform protocol conversion between the server and the encryptor in the group.

2. The information processing system of claim 1, wherein the agent is further configured to:

communicate with the server by a special interface protocol;

obtain an idle connection from a resource pool and occupy said connection to perform communication between the server and the encryptor when the server performs the security call on the encryptor, and release said connection when the server terminates the security call on the encryptor, in which, a network address adopted by a connection in the resource pool is in a white list of the group containing the agent, and the white list is stored in each encryptor in the group; and maintain a private protocol of the encryptor, and perform protocol conversion between the private protocol and the special interface protocol on data transmitted via the connection.

3. The information processing system of claim 2, wherein the agent is further configured to:

perform statistics on the security call to obtain one or more combinations of time consumption, the number of calls and a failure rate of the security call.

4. The information processing system of claim 2, wherein, the special interface protocol comprises a remote procedure call protocol; and the resource pool comprises a plurality of connections, and each connection is a transmission control protocol persistent connection.

5. The information processing system of claim 1, wherein agents and encryptors in different groups are isolated from each other.

6. An information processing method for an encryptor, comprising:

sending, by a server, a security call request for performing security call on the encryptor to an agent via a special interface protocol;

obtaining, by the agent, an idle connection from a resource pool and occupying said connection to communicate with the encryptor;

converting, by the agent, the special interface protocol employed by the server for sending the security call request to a private protocol employed by the encryptor, and sending, by the agent, the security call request to the encryptor via said connection under the private protocol; and performing, by the encryptor, encryption and decryption processing, or signature verification on data from the server based on the security call request under the private protocol.

7. The information processing method of claim 6, wherein the method further comprises:

releasing, by the agent, said connection when the server terminates the security call on the encryptor.

8. The information processing method of claim 6, wherein after performing, by the encryptor, the encryption and, decryption processing, or the signature verification on the data from the server based on the security call request under the private protocol, the method further comprises:

generating, by the encryptor, a security call response based on the security call request, in which the security call response carries a result obtained by the encryptor performing the encryption and decryption processing, or the signature verification on the data from the server based on the security call request;

receiving, by the agent, the security call response via said connection and converting the private protocol to the special interface protocol for the security call response; and sending, by the agent, the security call response to the server under the special interface protocol.

9. The information processing method of claim 6, wherein obtaining, by the agent, the idle connection from the resource pool comprises:

determining, by the agent, whether the idle connection exists in the resource pool;

obtaining, by the agent, the idle connection in a case that the idle connection exists in the resource pool; and establishing, by the agent, a new connection with the encryptor based on a network address in a white list of a group containing the agent in a case that the idle connection does not exist in the resource pool.

10. The information processing method of claim 6, wherein after sending the security call request to the agent via said connection under the private protocol, the method further comprises:

resending, by the agent, the security call request for threshold times when the security call request fails to be sent.

11. A non-transitory computer-readable storage medium having stored therein instructions that, when executed by a processor of a device, cause the processor to perform an information processing method for an encryptor, wherein the method comprises:

sending, by a server, a security call request for performing security call on an encryptor to an agent via a special interface protocol;

obtaining, by the agent, an idle connection from a resource pool and occupying said connection to communicate with the encryptor;

converting, by the agent, the special interface protocol employed by the server for sending the security call request to a private protocol employed by the encryptor, and sending, by the agent, the security call request to the encryptor via said connection under the private protocol; and performing, by the encryptor, encryption and decryption processing, or signature verification on data from the server based on the security call request under the private protocol.

* * * * *